US006775455B1

(12) United States Patent
Mattsson (10) Patent No.: US 6,775,455 B1
(45) Date of Patent: Aug. 10, 2004

(54) SILICON MESA STRUCTURE INTEGRATED IN A GLASS-ON-SILICON WAVEGUIDE, AND A METHOD OF MANUFACTURING IT

(75) Inventor: Kent Erik Mattsson, Virum (DK)

(73) Assignee: NKT Research A/S, Kgs. Lyngby (DK)

( * ) Notice: Subject to any disclaimer, the term of this patent is extended or adjusted under 35 U.S.C. 154(b) by 11 days.

(21) Appl. No.: 10/111,391

(22) PCT Filed: Nov. 3, 2000

(86) PCT No.: PCT/DK00/00615

§ 371 (c)(1),
(2), (4) Date: Aug. 26, 2002

(87) PCT Pub. No.: WO01/33676

PCT Pub. Date: May 10, 2001

(30) Foreign Application Priority Data

Nov. 3, 1999 (DK) .......................... 1999 01580

(51) Int. Cl.[7] .................................................. G02B 6/26
(52) U.S. Cl. .............................. 385/131; 385/3; 385/8; 385/27; 385/39; 385/50; 385/14
(58) Field of Search ........................... 385/1–9, 14, 16, 385/50, 27, 39, 40, 41, 129–132

(56) References Cited

U.S. PATENT DOCUMENTS 4,585,299 A * 4/1986 Strain ......................... 385/132
5,057,022 A 10/1991 Miller .......................... 437/71
5,396,363 A 3/1995 Valette ........................ 359/248
5,780,875 A * 7/1998 Tsuji et al. .................... 257/81
5,793,913 A * 8/1998 Kovacic ........................ 385/49
5,825,524 A 10/1998 Faderl et al. ................ 359/245
6,320,888 B1 * 11/2001 Tanaka et al. ................ 372/32

FOREIGN PATENT DOCUMENTS

| GB | 2 318 647 | 4/1998 | |
| GB | 2 332 284 | 6/1999 | |
| JP | 10123341 A | * 5/1998 | ........... G02B/6/122 |
| WO | 00/58776 | 10/2000 | |

* cited by examiner

Primary Examiner—Hemang Sanghavi
Assistant Examiner—Scott Alan Knauss
(74) Attorney, Agent, or Firm—Jacobson Holman PLLC (57) ABSTRACT

An integrated silicon mesa structure integrated in a glass-on-silicon waveguide, and a method of manufacturing it. The silicon mesa waveguide is integrated in a glass-on-silicon waveguide composed of a wave-guiding core between lower and upper sheath layers having a refractive index lower than the index of the wave-guiding core. The silicon mesa structure is preferably made of the silicon substrate, and a low loss silicon mesa waveguide is formed by removing excess material below the mesa structure. Further, transitions between the glass-on-silicon waveguide the the silicon mesa waveguide section are preferably formed such that transmission of light passing the transitions is adiabatic.

20 Claims, 5 Drawing Sheets

Fig 7b

SILICON MESA STRUCTURE INTEGRATED IN A GLASS-ON-SILICON WAVEGUIDE, AND A METHOD OF MANUFACTURING IT

This is a nationalization of PCT/DK00/00615 filed Nov. 3, 2000 and published in English.

BACKGROUND OF THE INVENTION

1. Field of the Invention

The invention relates to a silicon mesa structure integrated in a glass-on-silicon waveguide for transmission and modulation of electromagnetic radiation.

The invention also relates to a method of manufacturing a silicon mesa structure integrated in a glass-on-silicon waveguide for transmission and modulation of electromagnetic radiation.

2. Description of the Related Art

Glass on silicon is the most promising system of materials which has been developed till now with a view to manufacturing integrated optics. The manufacturing process is inexpensive and compatible with silicon based microelectronics. A large number of low loss passive components may be manufactured on large substrates, good low loss coupling to optical fibres is possible, and low rate (less than 1 MHz) modulation has been demonstrated by the use of the photoelastic effect. The first active components (amplifiers and lasers) in glass-on-silicon waveguides have been demonstrated, but to provide optical sources and detectors for the communication wavelengths (1.3–1.6 $\mu$m), it is necessary to use hybrid integration. Also, modulation at frequencies above 1 GHz has been demonstrated by the use of hybrid integration with semiconductor materials. This is complicated as well as expensive. This has led to experiments with direct integration of polymer material in glass-on-silicon waveguides for use as optical modulators. The use of polymer materials is associated with a reduced service life of the component and thereby a reduced reliability of the modulator.

For the transfer of information through an optical communications system it is required that a property of the light is changed in accordance with the information. Information may thus be transferred to a light wave by changing its intensity, phase, frequency, polarization or direction in analog or digital form. In particular, modulation of the intensity of light at high frequencies (greater than 1 GHz) is of great importance in connection with the input of information into communications systems. Likewise, modulation of the direction is of potentially great importance in optical time division multiplexing and demultiplexing.

Planar optical waveguides for modulation of light are well-known. The modulation is generated e.g. by varying the refractive index or the propagation loss in the waveguide. This may be achieved e.g. by changing the concentration of free charge carriers in a semiconductor material. Thus, silicon may be used as a modulator, the concentration of free charge carriers being controlled through a pn-junction. The development of such semiconductor based optical components has taken place in relative isolation with respect to glass-on-silicon components.

Silicon based modulators are typically manufactured by depositing low-doped epitaxial silicon directly on a high-doped silicon substrate or an oxidized silicon substrate (in a Silicon-on-insulator structure (SOI)). A one-dimensional waveguide (film waveguide) is provided, as low-doped silicon exhibits a higher refractive index than high-doped silicon owing to the difference in concentration of free charge carriers in the materials. A two-dimensional waveguide may be provided by forming a ridge in an epitaxial material and through doping adjacent areas of the core. An electro-optical modulator is provided in this type of waveguide by introducing p-type and n-type doping in the silicon material in the sheath layers of the three-dimensional waveguide. These layers may be introduced in a lateral direction as well as in a vertical direction, so that n-type and p-type materials are present on their respective sides of the core of the waveguide. The doping may be carried out so that a single pn-diode or a number of these (through which unipolar or bipolar transistor structures may be formed) are created. Another method of controlling the number of free charge carriers in the waveguide is by making a metal oxide semiconductor transistor (MOSFET) structure. This structure, too, may be provided longitudinally of or transversely to the waveguide.

It is typical of silicon based waveguides that they exhibit relatively high propagation losses because of the high-doped substrates. The use of SOI substrates reduces this by increasing the distance between the waveguide and the high-doped substrate. The reduce the propagation loss to below 0.1 dB/cm it is necessary to use insulated layers which are at least 2 $\mu$m thicker than what is available as standard SOI wafers. For silicon to be of real interest as a medium in an integrated optical modulator, it is necessary that the rapid electrically controllable properties of silicon must be combined with passive low loss integrated waveguides (preferably less than 0.1 dB/cm). It has not been possible to satisfy this requirement with the previously proposed semiconductor based structures.

SUMMARY OF THE INVENTION

The object of the present invention is to provide a rapid and reliable electro-optical modulator for glass-on-silicon waveguides. The object of the invention is achieved by introducing a silicon mesa structure into the core or the sheath of a glass-on-silicon waveguide. Hereby, the reliable and rapid electrically controllable modulation of the silicon mesa structure are combined with the low propagation loss of the glass-on-silicon waveguide.

A waveguide may be provided in the silicon mesa structure by making the core of the waveguide of low-doped monocrystalline silicon, while the sheath may be provided by doping parts of the mesa structure and/or making parts such that these preferably consist of silicon dioxide. Here, the structure may advantageously be made of the silicon substrate material. This gives the advantage that the use of expensive epitaxial silicon or SOI substrates can be avoided. To achieve optical wave guidance in a waveguide composed of a silicon mesa structure made of the silicon substrate material, it is necessary to remove excess silicon substrate material below the mesa structure. A further advantage is that the propagation loss in the silicon mesa structure is reduced by removing excess silicon substrate material below it.

By changing the concentration of free charge carriers in the silicon waveguide, it is possible to change the effective refractive index in it. This results in a change in the optical path, which leads to a change in the phase of the light in the waveguide over the given extent. Optical path is here a measure of the time it takes the light of a given wavelength and type to pass through the silicon waveguide.

For the change of the refractive index through variation in the concentration of the free charge carriers in the waveguide, it is expedient if the silicon waveguide is constructed as a diffused pin diode. By applying an electrical signal in the forward direction or reverse direction of the diode, charge carriers may be injected into or be depleted from the diode. To achieve fast modulation, the modulator, in a preferred embodiment, will be based on the depletion of charge carriers. This is achieved by biasing the diode in the reverse direction and modulating this voltage.

It is an advantage if the silicon modulator is constructed such that the glass-on-silicon waveguide is recessed in the silicon substrate. This ensures that the optical axes of the glass-on-silicon waveguide and the silicon waveguide coincide. This enables coupling of light from the glass-on-silicon waveguide to the silicon waveguide (and vice versa). It is a further advantage if the glass-on-silicon waveguide is constructed such that the glass-on-silicon waveguide is recessed in the silicon substrate and the upper sheath glass is limited to cover just the recessed part of the waveguide. This structure reduces the double refraction known in glass on silicon, which occurs because of the difference in thermal expansion of the silicon substrate and the glass structure. The advantage is not limited to a glass-on-silicon waveguide with a silicon mesa structure inserted into the core and/or the sheath of a glass-on-silicon waveguide. The effect of removing excess glass from the surface of the silicon substrate applies generally to all types of glass-on-silicon waveguides. Here, a clear reduction in the double refraction known for glass on silicon can generally be achieved.

The invention thus combines the electro-optical properties of silicon, which give rise to a relatively high transmission loss (0.5–1.0 dB/cm), and the low transmission loss (0.02–0.05 dB/cm) of the passive glass-on-silicon waveguide.

It is noted in this connection that it is an advantage to use adiabatic transmission of light power between the glass-on-silicon waveguide and the silicon waveguide (and vice versa). The silicon waveguide exhibits a very small spot size (wave type profile) because of the relatively high refractive index in the core. In contrast to this, glass on silicon exhibits a spot size which is comparable to the spot size in an optical fibre. Thus, a silicon waveguide will exhibit a spot size ($1/e^2$ diameter) which is 1.5–2.5 µm, while an optical fibre typically exhibits a spot size of about 10 µm, both at a wavelength of 1.55 µm. An adiabatic coupling ensures that the spot sizes of the two waveguides are adjusted to each other by a gradual change of the profile from the dominating form in one waveguide to the dominating form in the other waveguide. Thus, the transmission allows passage of light between the two waveguides without loss of optical power. An adiabatic transmission may advantageously be provided, in that the end members of the silicon waveguide section are formed such that these have a width which decreases progressively over a given length toward the glass-on-silicon waveguide.

With a view to using the silicon waveguide for modulation of the phase of the light, it is an advantage that the glass-on-silicon waveguide and the silicon waveguide section just allow transmission of the fundamental wave type. This gives the best interplay between the light and the modulation signal. A monomode waveguide may be produced by dimensioning the size of the intrinsic area of the silicon waveguide section so that it just supports the fundamental wave type. This may e.g. be combined with a ridge of the cross-section of the waveguide and by diffusing n-type or p-type doping in the material on the sides of the step.

The advantage of a diffused profile is that irregularities in the surface are reduced by the diffusion. The use of a diffused profile results in a concentration of both the propagating light wave and the electrical modulator signal in the same part of the waveguide structure. Moreover, a buried step profile will allow a more equal distribution of the change in the size of the intrinsic area.

For an application as an intensity modulator or a wavelength filter, it is expedient that at least one silicon mesa structure is arranged in an interferometric configuration.

When using the silicon waveguide of the invention for directional modulation, it is an advantage if it contains several sections which may be modulated individually. These sections may be arranged in extension of each other as well as at the side of each other, this both in parallel and with a small angle between the individual sections.

Expedient embodiments of the silicon waveguide are defined in the dependent claims in general.

As mentioned, the invention also relates to a method.

This method is characterized by comprising the steps of:
a) applying a mask to the front side of a silicon substrate and forming a mesa structure, following which a first layer of sheath glass is formed,
b) applying a further mask to the front side of the silicon substrate and removing parts of the first layer of sheath glass,
c) forming an optical waveguide consisting of a core and an upper sheath glass on the front side of the silicon substrate,
d) applying a further mask to the front side of the silicon substrate and removing parts of the upper sheath glass and the core, following which a first area in the silicon mesa structure is doped,
e) applying a further mask to the rear side of the silicon substrate and removing excess substrate material below the silicon mesa structure,
f) doping the rear side of the substrate and a second area of the silicon mesa structure,
g) applying a diffusion barrier to the front and rear sides of the silicon substrate,
h) applying a mask to the front side of the silicon substrate, through which mask holes in the diffusion barrier and the metallization to a first area of the silicon mesa structure are formed,
i) applying a mask to the rear side of the substrate, through which mask holes in the diffusion barrier and the metallization to a second area of the silicon mesa structure are formed.

Expedient embodiments of the method of the invention include forming the first layer of sheath class by chemical oxidation and/or forming the diffusion barrier by $Si_3N_4$. As a further embodiment, the removal of excess substrate material below the silicon mesa structure may be carried out using an electrochemical etch stop.

BRIEF DESCRIPTION OF THE DRAWINGS

The invention will now be explained more fully with reference to the known as well as novel structures according to the invention shown in the drawing, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
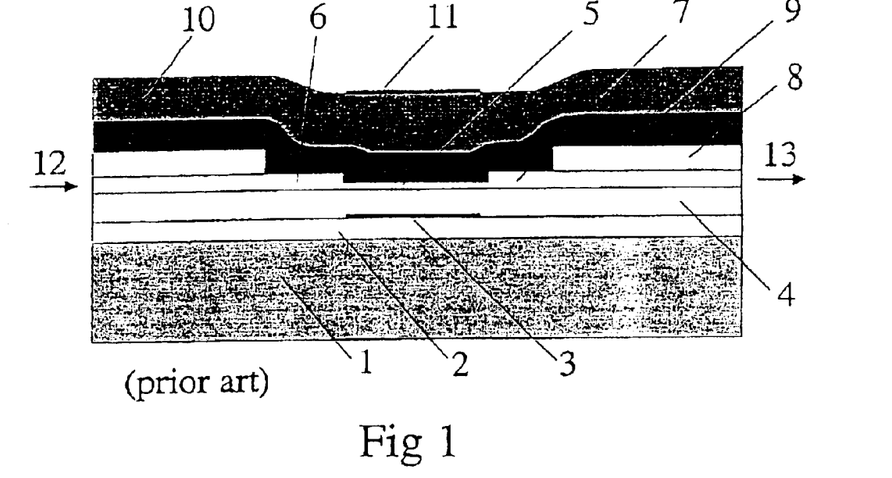
FIG. 1 shows a known electro-optical modulator. Shown here is a cross-section perpendicular to the plane of the substrate and along the optical axes of a component with a polymer waveguide modulator integrated in a planar optical glass on a silicon waveguide.

In FIG. 1, a substrate material is designated 1, while a first lower sheath glass layer is designated 2. A first electrode is designated 3, while a second lower sheath glass layer is designated 4. A waveguide core is designated 5, and a first upper sheath, glass layer is designated 8. This has been removed in part so that a polymer material designated 9 can be brought into close contact with the waveguide core 5. The transitions between the glass waveguide and the polymer modulator are provided at 6 and 7 through adiabatic transitions. An upper sheath layer is designated 10, and a second electrode is designated 11. This component is intended to change the phase of the light so that the light is coupled in at 12 and modulated light is coupled out at 13, or vice versa. It should be mentioned in this connection that the modulator does not use the substrate material for anything else than support of the structure.

Figure 2:
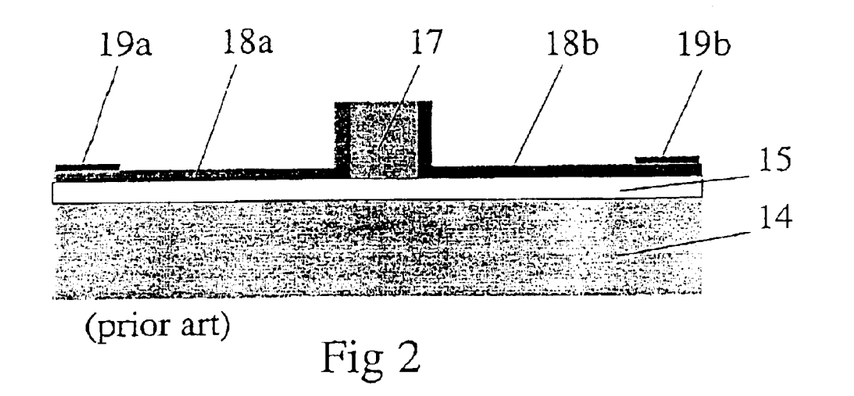
FIG. 2 shows a known silicon waveguide modulator made of an SOI material. Shown is a cross-section perpendicular to the optical axis through the silicon waveguide.

FIG. 2 shows an SOI structure, where a silicon substrate material is designated 14, while a silicon dioxide layer is designated 15, and a monocrystalline silicon is designated 17. In this silicon layer there is formed a mesa structure which is doped on the two sides to n-type and p-type, designated 18a and 18b respectively. Metallic contacts are established at 19a and 19b to these doped materials. The concentration of free charge carriers may be controlled through these contacts by biasing the lateral pin diode in the forward direction or the reverse direction. It should be mentioned in this connection that in this construction, too, the modulator just uses the substrate material for support of the structure.

Figure 3:
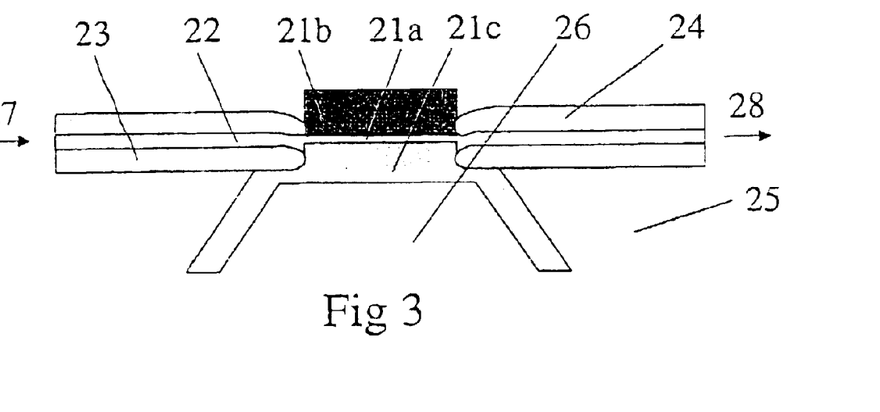
FIG. 3 shows a silicon waveguide integrated in a glass-on-silicon waveguide of the invention. Shown here is a cross-section perpendicular to the plane of the substrate and along the optical axes of a component.

In FIG. 3, 21a designates the core of an integrated silicon mesa waveguide which has an axis in common with a glass-on-silicon waveguide core 22 along which the light is propagated from e.g. 27 to 28, or vice versa. As will be known, the glass-on-silicon waveguide is composed of a core between lower and upper sheath layers 23, 24. A mesa waveguide section 21a is arranged between the two parts on the glass-on-silicon waveguide and is intended to change the phase of the light, so that the light is coupled in at 27 and modulated light is coupled out at 28, or vice versa. The silicon mesa waveguide is made of the silicon substrate 25 by removing excess material 26.

The effective refractive index of the silicon mesa waveguide 21a is controlled by applying an electrical signal across a pin diode formed in the mesa structure 21b, 21a, 21c.

The size and the shape of the core in the glass-on-silicon waveguide as well as the silicon mesa waveguide may be dimensioned for both single mode and multimode wave propagation.

Figure 4:
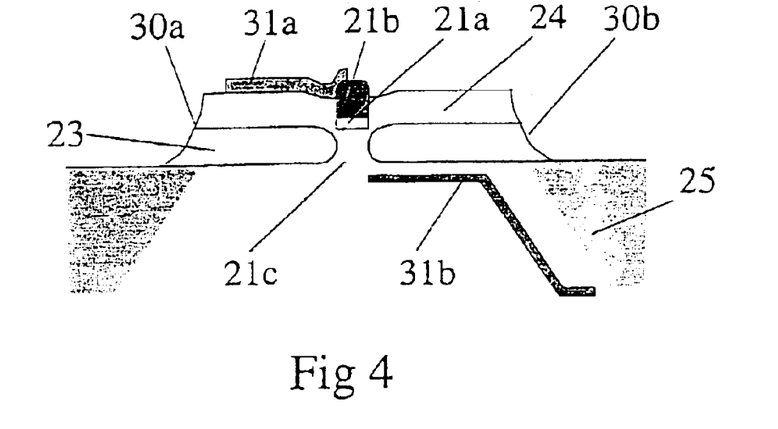
FIG. 4 shows a cross-section perpendicular to the optical axis through the silicon waveguide section in FIG. 3, when the waveguide is formed as a pin diode vertically on the plane of the substrate.

FIG. 4 shows a cross-section of the silicon mesa waveguide section with a pin diode 21b, 21a, 21c surrounded by sheath glass 23, 24. Electrodes are formed at 31a and 31b which provide electrical contact to the p-type and n-type silicon material. An electrical signal is applied through these across the diode. The boundary of the glass-on-silicon waveguide is shown at 30a and 30b.

Figure 5:
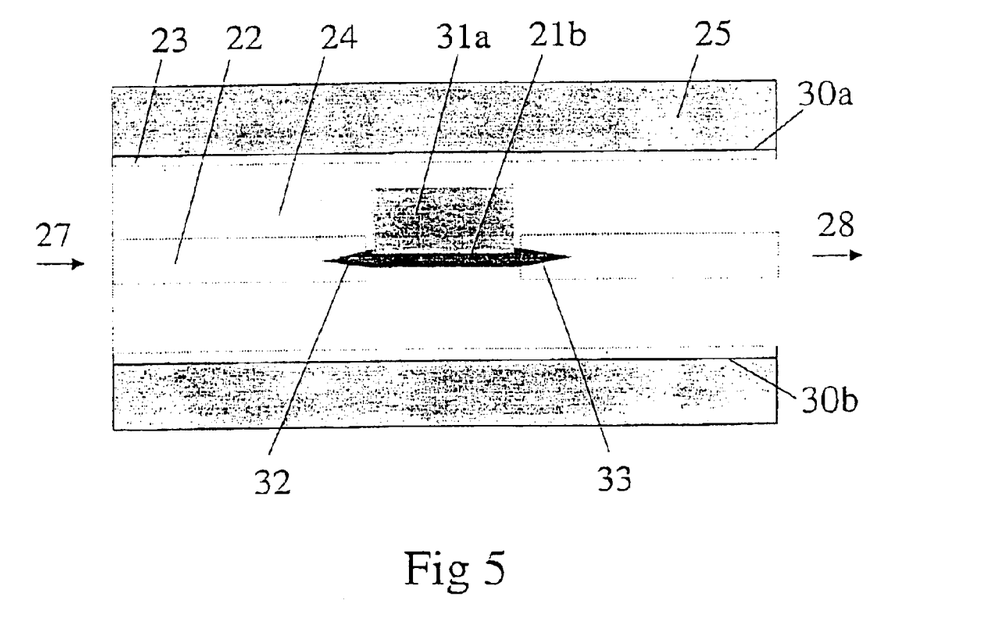
FIG. 5 shows a cross-section along the optical axes in the plane of the substrate of the silicon waveguide section integrated in a planar optical waveguide in FIG. 3, FIGS. 6a–6g in series show the method of manufacturing the silicon waveguide integrated in a glass-on-silicon waveguide, as shown in FIG. 3, FIGS. 7a–7b show an alternative embodiment of the invention when the waveguide is formed as a pin diode in the plane of the substrate and positioned in the sheath layer of the glass-on-silicon waveguide. Thus, 7a shows a cross-section perpendicular to the plane of the substrate and along the optical axis of a component, while 7b shows a cross-section perpendicular to the optical axis.

In FIG. 5, 31a designates the core of an integrated silicon mesa waveguide which has an axis in common with a glass-on-silicon waveguide core 22 along which the light is propagated. The width of the silicon waveguide progressively decreases over a given extent in the transitions between the glass-on-silicon waveguide and the silicon waveguide 32, 33. This provides an adiabatic transmission of the light that passes the transitions. The surface of the silicon substrate is shown at 25, where the glass layers have been removed to reduce the double refraction in the glass-on-silicon structure at the transitions designated 30a and 30b.

In FIG. 6, the front side of a silicon substrate 25 has formed thereon a mesa structure 29 in the substrate material, and a first layer of sheath glass 23 is formed.

Figure 6A:
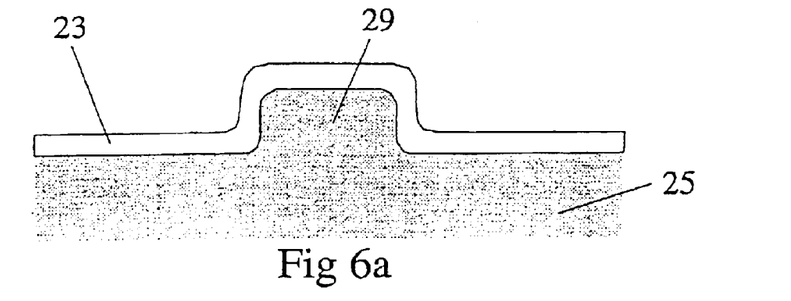
Figure 6B:
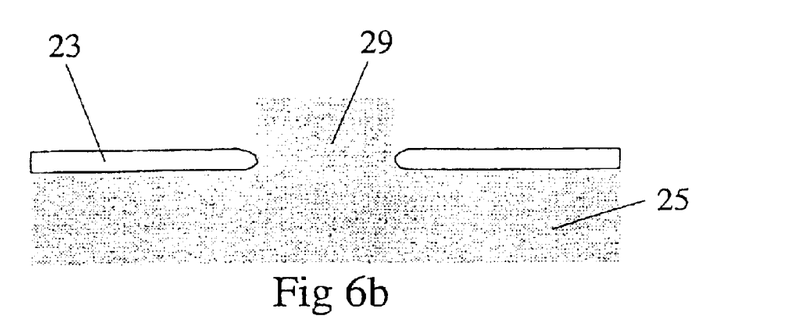

A further mask is applied to the front side, and parts of the first layer of sheath glass are removed above the mesa structure, as shown in FIG. 6b. The sheath glass is also removed at 30a and 30b, as shown in FIG. 5.

Figure 6C:
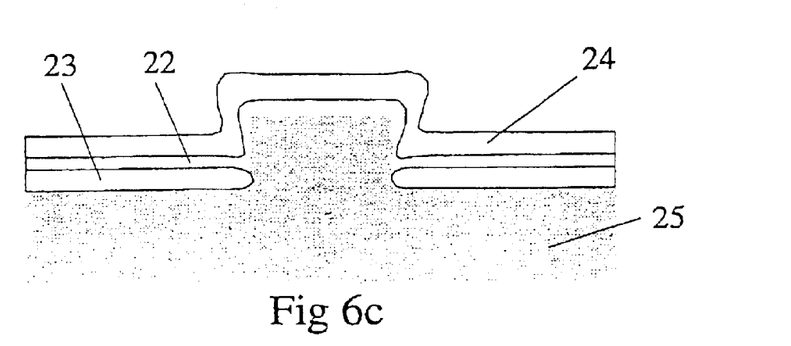

An optical waveguide consisting of a core 22 and an upper sheath glass 24 is formed on the front side of the silicon substrate, as shown in FIG. 6c.

Figure 6D:
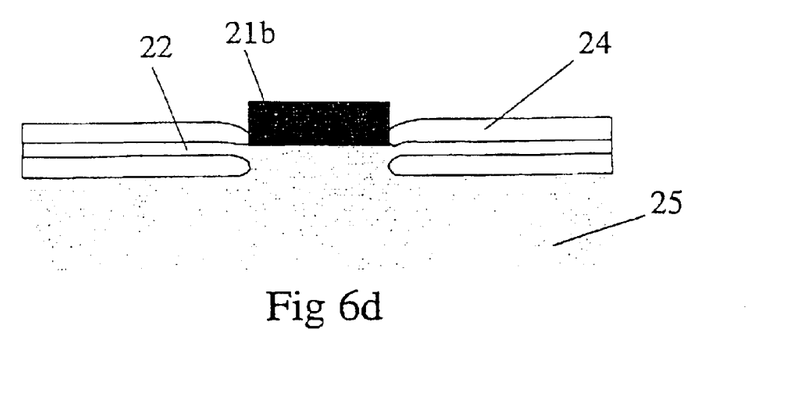

A mask is applied to the front side of the substrate, and a first area in the silicon mesa structure is doped (e.g. to p-type) through the mask, as shown in FIG. 6d in which it is designated 21b.

Figure 6E:
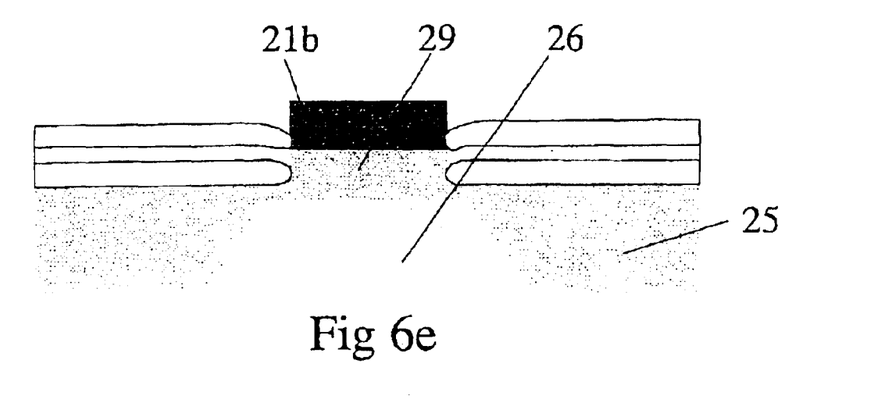

A mask is applied to the opposite side of the silicon substrate 25, and then excess substrate material 26 is removed below the silicon mesa structure, as shown in FIG. 6e.

Figure 6F:
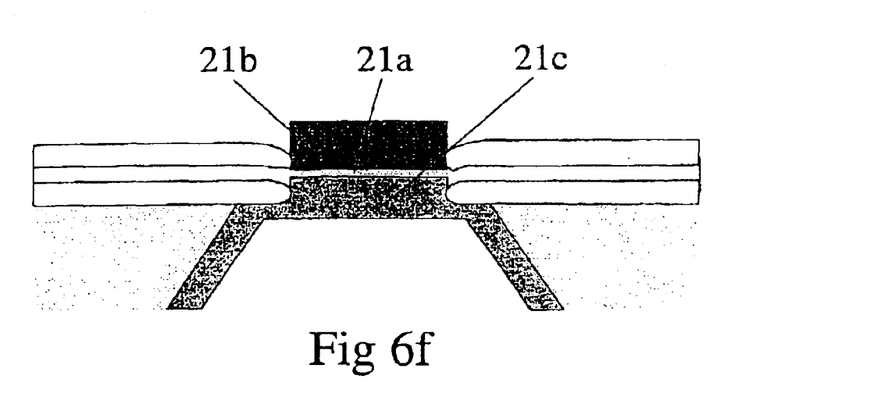

The rear side of the silicon substrate and the underside of the mesa structure are doped to e.g. n-type. Hereby, a second area 21c is created in the silicon mesa structure, as shown in FIG. 6f.

Figure 6G:
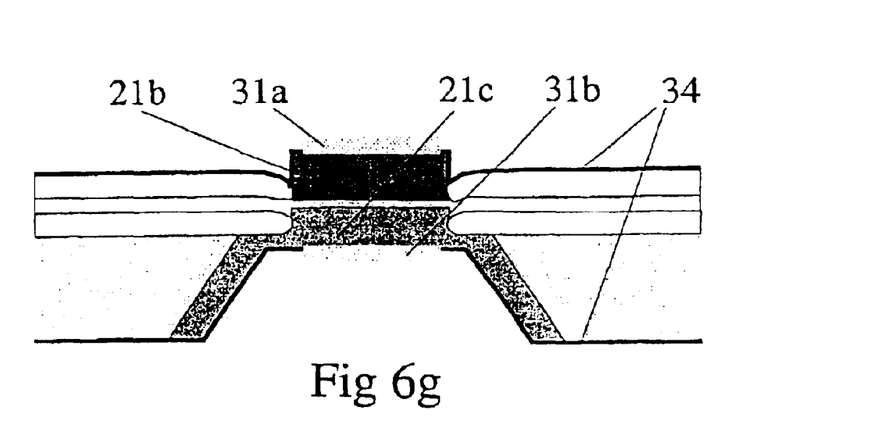

A diffusion barrier designated 34 is applied to the front and rear sides of the silicon substrate, as shown in FIG. 6g. A mask is applied to the front side of the silicon substrate, and through this mask holes in the diffusion barrier and metallization 31a to the area 21b are formed. Finally, a mask is applied to the rear side of the silicon substrate, and through this mask holes in the diffusion barrier and metallization 31b to the area 21c are formed.

Figure 7A:
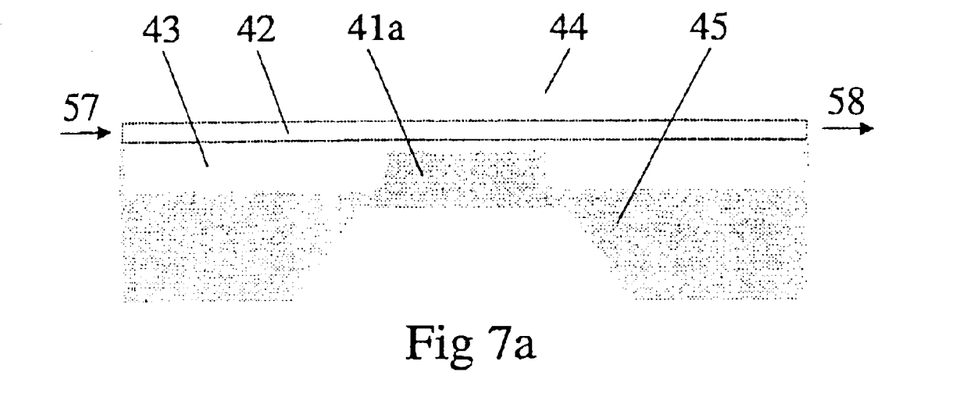

In FIG. 7a, 41a designates the core of an integrated silicon mesa waveguide which is introduced into the sheath 43 on a glass-on-silicon waveguide. As described before, the glass-on-silicon waveguide is composed of a core 42 between a lower sheath layer 43 and an upper sheath layer 44. Over part of the length of the glass-on-silicon waveguide there is a arranged a mesa waveguide section 41a in parallel with the glass-on-silicon waveguide in the sheath of it. The mesa structure is intended to change the phase of the light so that the light is coupled into the glass-on-silicon waveguide at 57 and modulated light is coupled out of the glass-on-silicon waveguide at 58, or vice versa. The silicon mesa waveguide is made of the silicon substrate 45 by removing excess material. The effective refractive index of the silicon mesa waveguide 41a and the glass-on-silicon waveguide, which runs in parallel with this section, is controlled by applying an electrical signal across the pin diode designated 41b, 41a, 41c provided in the mesa structure designated 49 in FIG. 7b. The electrical contacts to the p-type and n-type areas 41b and 41c, respectively, are designated 47 and 48, respectively.

The function of the above-mentioned, manufactured component is as follows:

By applying a voltage between the electrodes 31a and 31b, the diode, which is formed by the layers 21bb, 21a, 21c, may be biased in the forward direction or the reverse direction.

In a first state for use, a voltage applied in the forward direction will inject free charge carriers into the waveguide core 21a. Holes are injected from the p-type region 21b, while electrons are injected from the n-type region 21c. Hereby, the refractive index and the extinction in the core 21a of the waveguide are changed. For an injection level of free charge carriers with a density of up to $10^{19}$ cm$^{-3}$, the change in the refractive index will dominate. In this state, the light through the section will undergo a phase shift which is proportional to the change in the refractive index.

In a second state for use, the injection level is increased to a charge carrier density above $10^{19}$ cm$^{-3}$. In this state, the light through the section will undergo a strong damping and reduction in refractive index, so that the section no longer serves as a waveguide. Here, the section will serve as an extinction modulator.

In both of the above states of operation, phase modulation and extinction modulation, the operational rate will be of paramount importance for use in connection with intensity modulation. In both states, the modulation rate is limited by the recombination rate of silicon, which is typically of the order of microseconds. The small cross-section in which the waveguide is positioned means, however, that there is a short distance to the doped areas and the transitions to silicon dioxide, where the life-time of free charge carriers is less than 1 nanosecond. Thus, the modulation rate of components operated in the two above states will primarily be limited by the diffusion rate of charge carriers from the waveguide core 21a to the transitions to the doped areas 21b and 21c as well as the sheath glasses 23 and 24. This will give rise to modulation rates below 1 nanosecond.

In a third state for use, the diode is biased in the reverse direction. In this state, recombination of charge carriers plays no role for the modulation rate. In this state, the area of the depletion region in the pin diode is changed by depleting charge carriers from the diode. Changing the area of the depletion region produces a change in the effective refractive index of the waveguide, and a phase modulation is achieved without significant change in the extinction in the waveguide. The rate at which the modulation may be carried out depends on the structure of the electrodes and the electronics which is used for driving the diode. The change in effective refractive index that may be expected in this state of operation is less than the two above ones, and longer sections are therefore required for modulation. Thus, an about 1 mm long section will typically be required to produce a change in the phase of the light of $\pi$, while the first state requires less than 500 $\mu$m long sections for operation.

EXAMPLE 1

When using the silicon mesa waveguide described above—introduced into the core of a glass-on-silicon waveguide—in the first or third operational state, it is possible to make an intensity modulator. This is achieved by combining the silicon waveguide section with two 3 dB power splitters so that the section is positioned in one arm of an interferometer, while the other arm serves as a reference. The arriving light wave will first be divided into two power parts of the same size, and then one part is subjected to phase modulation through the silicon waveguide section, while the other part continues unchanged through the other arm. At the second 3 dB power coupler, the two halves of the light wave will interfere. If a phase shift of $\pi$ between the two halves has been achieved, these will interfere destructively. This has the consequence that no light passes through the splitter. In contrast, the two halves will interfere constructively if there is no phase shift between these. The modulator allows intensity modulation in an analog form by using all states of phase shift between the two arms in the interferometer. In connection with high speed communications systems, the modulation will normally be performed in digital form so that a phase shift of zero and $\pi$, respectively, is used.

EXAMPLE 2

A directional modulator may be made by placing two silicon sections in parallel at the side of each other immediately before a 3 dB power splitter. By controlling the profile of the light wave before the power splitter by means of the size of the depletion region below the two diodes, it is possible to control the coupling to one of the two outputs on the power splitter. Thus, the diode closest to the arm to which the signal is desirably coupled, will be greatly biased in the reverse direction, while the other diode will only be slightly biased in the reverse direction.

As is well-known, the use of a directional coupler makes it possible to achieve time division multiplexing and time division demultiplexing.

EXAMPLE b 3

Figure 7B:
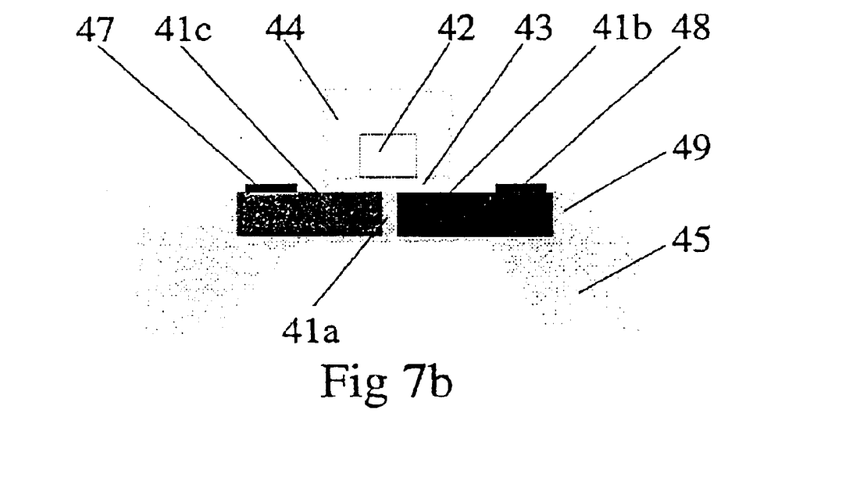

By using the silicon waveguide section described above in the first or third operational state it is possible to make an intensity modulator directly in the glass-on-silicon waveguide by introducing a silicon mesa waveguide into the sheath of the glass-on-silicon waveguide, as shown in FIGS. 7a and 7b. Hereby, a direction coupler is formed which is an interferometric structure. The light through the glass-on-silicon waveguide is controlled through phase modulation of light in the silicon mesa waveguide.

This is achieved by controlling the coefficient of coupling between the two waveguides. This is determined by the difference in the coefficient of propagation between even and uneven wave types in the coupling region of the directional coupler. By adapting the length over which the two waveguides interplay to the coupling length of the directional coupler, the optical effect may effectively be transferred from one waveguide to the other. An intensity modulator is produced hereby.

Although the invention has been explained in connection with specific examples and embodiments, nothing prevents the manufacture of additional embodiments within the scope defined by the claims.

This might e.g. be a lateral position of the diode in the silicon section introduced into the core of a glass-on-silicon waveguide, thereby allowing contacting of the component from one side.

Furthermore, the waveguide profile may comprise triangular structures produced e.g. by first forming the mesa structure through a KOH etch of the surface of the silicon substrate, etc.

Another possible embodiment of the structure is achieved by providing the electrode for contacting of the structure as a microstrip waveguide. This embodiment will enable direct modulation of a light wave by a microwave signal.

Further, a plurality of pn-transitions may be combined with insulated electrodes for use in fast operation to deplete free charge carriers from the waveguide.

Likewise, total internal reflection types of components, e.g. for use in directional modulation, may be manufactured by using the invention described here. Also, in an interferometric configuration, the invention may be used e.g. for voltage-controlled wavelength filters.

A 3 dB coupler may be manufactured by introducing a silicon waveguide into the sheath of a glass-on-silicon waveguide and adapting the coupling length of these. Hereby, an interferometric structure with two 3 dB couplers and a silicon mesa section may be combined to an intensity modulator.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. An integrated optical waveguide formed on a silicon substrate with a wave-guiding core for transmitting electromagnetic radiation arranged between upper and lower sheath glasses which exhibit a refractive index which is lower than that of the wave-guiding core, comprising a silicon mesa structure introduced into the core and/or the sheath of the waveguide, in which excess silicon substrate material below said mesa structure is removed.

2. The integrated optical waveguide according to claim 1, wherein in the silicon mesa structure a core of a silicon waveguide is made of low-doped monocrystalline silicon, while a sheath is made of doped regions and/or regions of silicon dioxide or/and $Si_3N_4$.

3. The integrated optical waveguide according to claim 1, wherein the silicon mesa structure is made of the silicon substrate material.

4. The integrated optical waveguide according to claim 1, wherein modulation of light is achieved through a change in concentration of free charge carriers in the silicon mesa structure.

5. The integrated optical waveguide according to claim 1, wherein the silicon mesa structure is formed as a pin diode in monocrystalline silicon, a depletion area together with a central section of the diode forming a wave-guiding core, while opposed diffused n-type and p-type doped regions constitute parts of the sheath together with layers of silicon dioxide.

6. The integrated optical waveguide according to claim 5, wherein modulation of a light wave through the silicon mesa structure is achieved by changing a size of the depletion area in the pin diode by modulating a bias in a reverse direction.

7. The integrated optical waveguide according to claim 1, wherein the waveguide is recessed in the silicon substrate so that optical axes of the glass-on-silicon waveguide and the silicon mesa structure coincide.

8. The integrated optical waveguide according to claim 1, wherein the waveguide is recessed in the silicon substrate and the upper sheath glass is limited to cover just the recessed part of the waveguide.

9. The integrated optical waveguide according to claim 2, wherein transitions between the waveguide formed by the sheath glasses and the silicon mesa waveguide section are formed such that transmission of light passing the transitions is adiabatic.

10. The integrated optical waveguide according to claim 1, wherein ends of the silicon mesa structure are terminated in a constriction toward the waveguide.

11. The integrated optical waveguide according to claim 2, wherein the waveguide formed by the sheath glasses and the waveguide in the silicon mesa structure are monomode.

12. The integrated optical waveguide according to claim 1, wherein at least a silicon mesa structure is arranged in at least an interferometric configuration.

13. The integrated optical waveguide according to claim 1, wherein said waveguide contains several sections which may be modulated individually.

14. A method of manufacturing an integrated optical waveguide for transmitting electromagnetic radiation and having a silicon mesa structure, comprising the steps of:
    a) applying a mask to a front side of a silicon substrate and forming a mesa structure, following which a first layer of sheath glass is formed;
    b) applying a further mask to the front side of the silicon substrate and removing parts of the first layer of sheath glass;
    c) forming an optical waveguide including a core and an upper sheath glass on the front side of the silicon substrate;
    d) applying a further mask to the front side of the silicon substrate and removing parts of the upper sheath glass and the core, following which a first area in the silicon mesa structure is doped;
    e) applying a mask to a rear side of the silicon substrate and removing excess substrate material below the silicon mesa structure;
    f) doping the rear side of the substrate and a second area of the silicon mesa structure;
    g) applying a diffusion barrier to the front and rear sides of the silicon substrate;
    h) applying a mask to the front side of the silicon substrate, through which mask holes in the diffusion barrier and a first metallization to a first area of the silicon mesa structure are formed;
    i) applying a mask to the rear side of the substrate, through which mask holes in the diffusion barrier and a second metallization to a second area of the silicon mesa structure are formed.

15. The method according to claim 14, wherein the first layer of sheath glass in step a) is formed by chemical oxidation.

16. The method according to claim 14, wherein the diffusion layer in step g) is formed by $Si_3N_4$.

17. The method according to claim 14, wherein step e) of removing excess substrate material below the silicon mesa structure is carried out using an electrochemical etch stop.

18. An integrated optical waveguide formed on a silicon substrate with a wave-guiding core for transmitting electromagnetic radiation arranged between upper and lower sheath glasses which exhibit a refractive index which is lower than that of the wave-guiding core, comprising a silicon mesa structure introduced into the core and/or the sheath of the waveguide, said silicon mesa structure being formed as a pin diode in monocrystalline silicon, a depletion area together with a central section of the diode forming a wave-guiding core, while opposed diffused n-type and p-type doped regions constitute parts of a sheath together with layers of silicon dioxide.

19. An integrated optical waveguide formed on a silicon substrate with a wave-guiding core for transmitting electromagnetic radiation arranged between upper and lower sheath glasses which exhibit a refractive index which is lower than that of the wave-guiding core, comprising a silicon mesa structure introduced into the core and/or the sheath of the glass-on-silicon waveguide, the silicon mesa structure having a wave-guiding core being made of low-doped monocrystalline silicon, and a sheath being made of doped regions and/or regions including silicon dioxide or/and $Si_3N_4$, transitions between the waveguide and the silicon mesa waveguide section being formed such that transmission of light passing the transitions is adiabatic.

20. An integrated optical waveguide formed on a silicon substrate with a wave-guiding core for transmitting electromagnetic radiation arranged between upper and lower sheath glasses which exhibit a refractive index which is lower than that of the wave-guiding core, comprising a silicon mesa structure introduced into the core and/or the sheath of the waveguide, with ends of the silicon mesa structure being terminated in a constriction toward the waveguide.

* * * * *